March 29, 1949. H. SOKOL 2,465,489
PRODUCTION OF TRIOXANE
Filed July 16, 1946
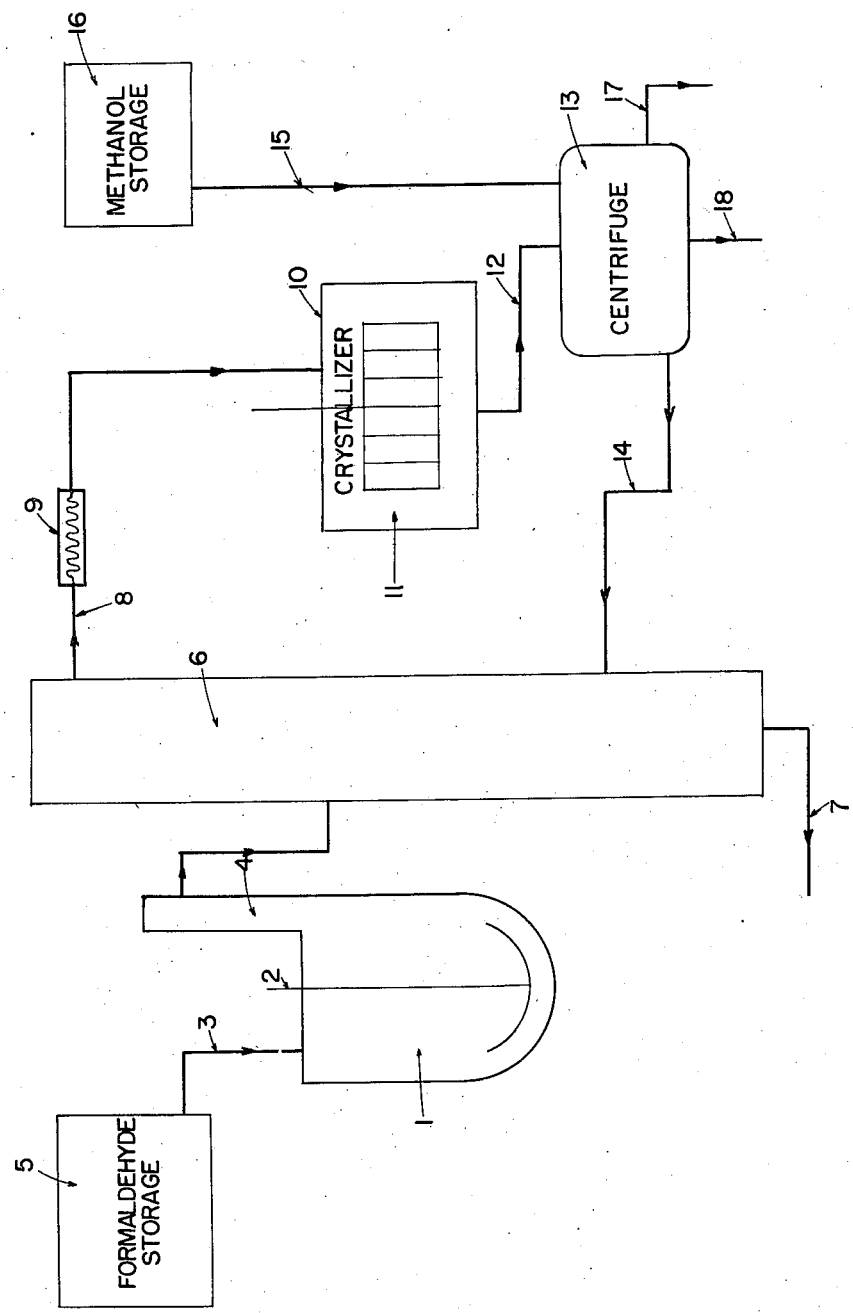
HERMAN SOKOL
*INVENTOR.*
BY Ferdinand E. Kopecky
HIS ATTORNEY Patented Mar. 29, 1949

2,465,489

UNITED STATES PATENT OFFICE 2,465,489

PRODUCTION OF TRIOXANE

Herman Sokol, Hasbrouck Heights, N. J., assignor to Heyden Chemical Corporation, New York, N. Y., a corporation of Delaware Application July 16, 1946, Serial No. 683,811

7 Claims. (Cl. 260—340)

The present invention relates to the production and recovery of trioxane and in one of its specific aspects relates to the recovery of trioxane from an aqueous distillate containing trioxane and smaller proportions of formaldehyde by crystallization and removal of formaldehyde from the resulting crystals by washing them with substantially anhydrous methanol.

Trioxane, the cyclic trimer of formaldehyde, which is also known as symmetrical trioxane and alpha-trioxymethylene, is a white crystalline solid. The melting and freezing points of the pure compound are sharp; its melting point is approximately 63°–64° C. The boiling point of pure trioxane is approximately 114.5° C. and its flash point is approximately 45° C. It is exceedingly soluble in methylene chloride, chloroform and acetone, readily soluble in benzene, alcohol, ether and carbon tetrachloride and somewhat more difficultly soluble in petroleum ether. Trioxane is also readily soluble in water, 100 cc. of solution at 10° C. containing approximately 12 grams, at 18° C. containing 17.2 grams (16.6% by weight) and at 25° C. containing 21.1 grams (20.2% by weight) of trioxane; trioxane is infinitely soluble in water at approximately 62° C. It forms a constant-boiling azeotrope with water which contains approximately 70% by weight of trioxane and has a boiling point of approximately 91.3° C.

One of the principal uses of trioxane is in the production of resins with highly reactive phenols such as resorcinol, in which it acts as a source of formaldehyde. Because of its lack of reactivity, trioxane can be incorporated into mixtures with such highly reactive phenols and the formaldehyde can be released from the trioxane upon the addition of sulfuric acid or other trioxane-depolymerization catalysts. It is also useful in other applications where an initially "unreactive formaldehyde" is required. When intended for such uses, trioxane must be free to a high degree from formaldehyde and hexamethylene tetramine and similar highly reactive formaldehyde - engenderers. Trioxane is also useful as a source of formaldehyde for reactions that are to be conducted in anhydrous media but in such cases the freedom from formaldehyde and hexamethylenetetramine is not a critical requirement.

It is a principal object of the present invention to provide an improved process for the production of trioxane. A further object of the present invention is to provide a process that is capable of producing trioxane having a high degree of purity and especially characterized in freedom from formaldehyde and hexamethylenetetramine and similar highly reactive formaldehyde-engenderers. Other objects and advantages of the invention, some of which are referred to more specifically hereinafter, will be apparent to those skilled in the art to which the invention pertains.

Trioxane is readily prepared by the polymerization of formaldehyde in the presence of sulfuric or other strong acids and by the treatment of paraformaldehyde or polyoxymethylenes with such acids. It has been prepared heretofore by many investigators in accordance with these general procedures. In preparing trioxane from aqueous formaldehyde solutions two factors are generally important, namely, the concentration of the formaldehyde solution and the concentration of the acid polymerization catalyst. Generally the higher the concentration of the formaldehyde solution, the greater is the conversion to trioxane, but the concentration should not be so high as to produce excessive amounts of paraformaldehyde in the solution. The formaldehyde solution used must be substantially free from methanol otherwise the formaldehyde will undergo reaction to form acetals such as methylal. The acid concentration which is used must be high enough to favor the formation of trioxane but not too high so as to favor the Cannizzaro or disproportionation reactions whereby formic acid and methyl formate are formed. Concentrations of sulfuric acid up to approximately 7% may be used satisfactorily.

Trioxane was recovered heretofore from such reaction mixtures by distilling the trioxane from the reaction mixture together with water and formaldehyde. (See Hammick and Boeree, J. Chem. Soc. (London), 1922, vol. 121, pages 2738 et seq.) From the distillate, trioxane can be recovered by extraction with water-immiscible solvents such as ether or methylene chloride. To free the product from formaldehyde, which is always present in the distillate, various procedures have been adopted. In one case, the distillate was extracted with methylene chloride and the free formaldehyde in the extract was converted to hexamethylenetetramine by washing with an aqueous solution of ammonia; however, the trioxane obtained by such procedure is always contaminated with small proportions of hexamethylenetetramine. In another case (F. Auerbach and H. Barschall, Arbeiten aus dem Kaiserlichen Gesundsheitsamt, 1905–6, vol. 27, pages 183 to 230, see page 220), the trioxane was crystallized from the distillate, separated by filtration, washed with ice water and dissolved in a strongly alkaline sodium sulfite solution, in which both trioxane and formaldehyde are soluble, but only the formaldehyde reacts with the sulfite. This solution was then saturated with salt and the trioxane extracted with ether.

I have now found that trioxane that is substantially free from formaldehyde and hexamethylenetetramine and other highly reactive formaldehyde-engenderers can be obtained by crystallizing the trioxane from an aqueous formaldehyde-containing trioxane solution, for example, such as the distillates described heretofore, and thereafter washing the crystals with a small proportion of anhydrous methanol or ethanol. The anhydrous alcohol removes substantially all traces of formaldehyde from the crystals and does not dissolve excessive amounts of trioxane.

This discovery has made possible a new continuous process for the production of trioxane which utilizes efficiently by recycling various of the products obtained in the individual portions of the process. Furthermore, the new process provides trioxane of high purity and in good yield without the use of expensive solvents and elaborate extraction procedures and with a minimum number of actual processing steps.

A preferred method of producing trioxane in accordance with the process of my invention is as follows, reference being made to the accompanying drawing which is a flow-sheet thereof.

A glass-lined steam-jacketed reactor 1 equipped with an efficient agitator 2 and provided with an inlet 3 and a short unpacked vertical column 4 having an efficiency of 2 to 3 or more theoretical plates is used. The reactor 1 is charged with 100 parts by weight of 60% aqueous methanol-free formaldehyde solution from storage tank 5 and is heated until the temperature of the solution therein reaches approximately 90° C. The agitator 2 is started either then or before and 5 parts by weight of concentrated sulfuric acid are added to the reactor 1. The temperature will rise to 95° C. and is thereafter maintained at about 96° to 97° C. so that a distillate is obtained which passes through the column 4. Fresh 60% formaldehyde at a temperature of approximately 90° C. from storage tank 5 is charged continuously to the reactor 1 at such a rate as to compensate for the liquid distilled from the reactor. At the head temperature of 96°–97° C. on column 4, about 5 to 10 parts of distillate will be obtained per hour.

The hot distillate is charged continuously to a fractionating column 6 having an efficiency of at least 5 theoretical plates and distilled at a reflux ratio of at least 2 to 1. The overhead from the fractionating column 6, which is at a temperature varying within the range of approximately 94° to approximately 96° C. consists of a mixture of approximately 50% by weight of trioxane, approximately 18% by weight of formaldehyde and approximately 32% by weight of water. The residue from the fractionating column, which is discharged through line or conduit 7, is a formaldehyde solution containing approximately 48% by weight of formaldehyde, which, if allowed to cool, will precipitate paraformaldehyde. From approximately 100 parts by weight of 60% formaldehyde solution, approximately 60 parts of distillate are obtained and 40 parts of residue.

The distillate from the fractionating column 6 is charged through line or conduit 8 to a condenser 9, where it is cooled to approximately 60° C., and then to a crystallizer 10. Cooling of the distillate to much below 60° C. may cause clogging of the condenser by crystallized trioxane.

In the crystallizer 10, which is provided with an agitator 11 and may be provided with a reflux condenser, the condensed distillate is cooled slowly to approximately 5° C. with constant stirring. The cold slurry is then discharged through conduit or line 12 to a centrifuge 13, where the crystals of trioxane are freed of mother liquor. The mother liquor is returned to the fractionating column 6 through line or conduit 14. The crystals in the centrifuge are then washed with a small portion of cold water and then with a small portion of cold anhydrous methanol or ethanol charged through conduit or line 15 from the storage tank 16. After centrifuging the crystals to remove the methanol or ethanol, the washings are discharged through conduit or line 17 and the purified trioxane crystals, which are now substantially dry, are discharged through conduit or line 18. A continuous crystallizer of conventional type is preferred but a batch crystallizer may be used and the operations performed batch-wise.

The trioxane can be recovered from the methanol or ethanol washings by distilling off the alcohol. Trioxane can be further recovered from the resulting residue. The distillate from methanol washings is substantially free from trioxane but that from ethanol washings may contain small proportions of trioxane.

The foregoing description relates to a preferred method of practicing the invention. The formaldehyde concentration may be greater or less than the 60% specified therein but since the distillate contains formaldehyde, trioxane and water in amounts equivalent to approximately 60% total formaldehyde, this concentration is preferred. The distillation may be conducted at different rates as is obvious, whereby the composition of the distillate will also be varied, but generally a distillation head temperature of approximately 96° to 97° C. will provide a distillate having a sufficiently high concentration of trioxane (25 to 30%) and a fast enough distilling rate. A distillate obtained at 90° to 92° C. contains more trioxane (approximately 60%) but the rate of distillation would be too slow and uneconomical. As stated hereinbefore, the formaldehyde solution used should be substantially free from methanol. Solutions of the desired concentration may be prepared by adding paraformaldehyde to more dilute aqueous solutions or by dissolving formaldehyde vapor directly in water or dilute aqueous solutions or by vacuum concentration of dilute aqueous formaldehyde solutions.

The distillation may be conducted at subatmospheric or preferably at superatmospheric pressures, whereby the distillation head temperatures will be correspondingly changed. A higher conversion is favored by the use of superatmospheric pressures in the initial distillation.

The proportion of sulfuric acid (5 parts per 100 parts of 60% formaldehyde solution) may be varied over a wide range and the sulfuric acid may be replaced by equivalent quantities of other strong acids such as para-toluenesulfonic acid that are substantially nonvolatile at the temperature of the distillation. As stated hereinbefore, sufficient acid should be used to give the requisite degree of reaction but the amount used should be less than that which would favor undesirable reactions.

The crystallization of the trioxane from the distillate may be effected by cooling the distillate to temperatures somewhat higher or lower than the specified 5° C. The solubility curve of trioxane in water at various temperatures declines rather sharply down to about 5° C. and considerable amounts of trioxane can be recovered in this manner from the distillate. When aqueous methanol-free solutions of formaldehyde are cooled to 5° C. or less, paraformaldehyde normally precipitates therefrom; in the crystallization process of the present invention, no separation of paraformaldehyde from the aqueous solution containing trioxane and formaldehyde was ever observed. This was quite unexpected.

For drying the crystals an enclosed centrifuge that is continuous in operation is preferred, in order to prevent the flow of air through the crystals; the vapor pressure of trioxane even at 5° C. is high enough to cause considerable losses if precautions are not observed in this respect.

The crystals may be washed with either anhydrous methanol, which is preferred, or with anhydrous ethanol. They may and preferably are given a preliminary washing with a small proportion of cold water (1 part for 10 parts by weight of crystals), especially if the formaldehyde content of the crystals is relatively high. The proportion of anhydrous methanol or ethanol which is to be used will to a great extent be dependent upon the formaldehyde and water content of the trioxane crystals but normally 1 to 2 parts to each 10 parts by weight of crystals is sufficient to remove all but the last traces of formaldehyde therefrom. Cold alcohol at a temperature of 0° C. is preferably used but the temperature may be varied somewhat, being limited on one hand by the solubility of trioxane therein and on the other hand by the solubility of water and formaldehyde therein. The methanol or ethanol may contain small amounts of water but it is apparent that the degree of purification effected may be reduced as a result. The alcohol removes residual water adhering to the crystals and thereby provides a product that is substantially dry. It is normally unnecessary to subject the product to other drying procedures.

The last traces of formaldehyde and water may alternatively be removed by melting the crude trioxane crystals, either before or after washing with cold water and alcohol, and distilling off a forerun corresponding to approximately 15% by weight of the melt at a head temperature up to approximately 114.5° C. This forerun will contain substantially all the water and free formaldehyde and a portion of the trioxane. Superatmospheric pressure in the distillation may be used, if desired, in preference to vacuum distillation. The pure liquid trioxane residue may be filtered and then allowed to solidify or can be flaked or otherwise formed.

Although the foregoing process is referred to as a continuous one, it may nonetheless be performed entirely batchwise, as is obvious.

The examples which follow disclose other specific preferred methods of practicing the invention and certain of the advantages accruing therefrom. All parts referred to are parts by weight.

*Example 1*

An aqueous trioxane distillate containing approximately 55 parts of trioxane, 20 parts of formaldehyde and 25 parts of water was cooled with agitation to 2° C., and the thick slurry was discharged to an enclosed centrifuge, and wrung free of mother liquor. There were obtained about 50 parts of wet crystals, which were washed on the centrifuge with 5 parts of water at a temperature of approximately 0° C. and finally with 5 parts of anhydrous methanol at a temperature of approximately 0° C. The methanol was removed by centrifugation to give 45 parts of trioxane which contained 0.1% water and 0.02% free formaldehyde. Analysis of the crystals indicated a trioxane content of 99.7%. The aqueous mother liquor and washings contained about 4.5 parts of trioxane.

The results of a series of repetitions of the various purification steps specified in this example, show that the trioxane crystals after centrifugation but before washing with water or alcohol contain 2 to 5% water and 0.3 to 1.0% free formaldehyde; after washing with cold water and centrifuging, the crystals contain 2 to 5% water and 0.1 to 0.4% free formaldehyde. After washing with cold methanol and centrifuging, the crystals contained 0.1% or less of water, and 0.02% to 0.001% free formaldehyde.

*Example 2*

An aqueous trioxane distillate containing approximately 26 parts of trioxane, 25 parts of formaldehyde and 49 parts of water was cooled and centrifuged as described in Example 1. There were obtained 23 parts of wet crystals, which were washed on the centrifuge with 2 parts of water at a temperature of approximately 0° C. and 2 parts of anhydrous ethanol at a temperature of approximately 0° C. The crystals after centrifugation consisted of 19 parts of trioxane, which assayed 99.5% trioxane and contained 0.1% water and 0.01% free formaldehyde. The aqueous mother liquor and washings contained about 7 parts of trioxane.

When the formaldehyde in an aqueous solution containing trioxane and formaldehyde is converted to hexamethylenetetramine by the addition of ammonia and the trioxane is separated by crystallization from the resulting solution containing hexamethylenetetramine, and the crystals are washed with anhydrous methanol, the separation of the hexamethylenetetramine is no more efficient than if it had been left as formaldehyde, that is, it is no more advantageous to convert the formaldehyde in the distillate to hexamethylenetetramine before crystallization than it is to leave the formaldehyde as such in the distillate. The results obtained by converting the formaldehyde in the distillate to hexamethylenetetramine are illustrated in Comparative Example 1, which follows hereinafter. It is accordingly a preferred feature of the process of my invention to omit or avoid any addition of ammonia to the distillate to effect any conversion of formaldehyde to hexamethylenetetramine.

*Comparative Example 1*

To an aqueous trioxane distillate containing approximately 57 parts of trioxane, 15 parts of formaldehyde and 28 parts of water was added, with agitation and cooling, 28% aqueous ammonia until the pH of the solution was about 11. The resulting solution was cooled to 10° C. and centrifuged. There were obtained about 45 parts of wet crystals which were washed on the centrifuge with 4 parts of water at a temperature of 0° C. and finally 5 parts of anhydrous methanol at a temperature of 0° C. After removal of the methanol by centrifugation there remained 39 parts of trioxane which was of 99.3% purity and contained 0.1% water and 0.15% hexamethylenetetramine. The aqueous mother liquor, containing about 16 parts of trioxane as well as ammonia and hexamethylenetetramine, was distilled through an efficient fractionating column. The fraction boiling at 88°–95° C. contained 15 parts of trioxane, 1 part of ammonia and 14 parts of water. Crystallization at 2° C., followed by centrifugation and washing as described in Example 1, gave 13 parts of trioxane, which was of 99.7% purity and contained 0.1% water and 0.04% hexamethylenetetramine. This is approximately the limit of freedom from hexamethylenetetramine that can be obtained by this treatment.

Inasmuch as the foregoing description comprises preferred embodiments of the invention it is to be understood that the invention is not limited thereto and that variations and modifications may be made in conventional manner without departing substantially from the invention, which is to be limited solely by the appended claims.

I claim:

1. A process for the recovery of trioxane from an aqueous solution containing formaldehyde and a substantial proportion of trioxane, which comprises cooling said solution until trioxane crystallizes out, continuing the cooling and thereafter separating the crystals of trioxane from the mother liquor and subsequently washing said crystals with a small portion of a substantially anhydrous monohydric aliphatic alcohol selected from the group consisting of methanol and ethanol at a temperature not in excess of approximately 0° C. to remove residual amounts of formaldehyde and water associated with the crystals.

2. A process for the recovery of trioxane from an aqueous distillate containing at least approximately 25% by weight of trioxane and containing formaldehyde, which comprises cooling said distillate to a lower temperature but above the freezing point of the distillate while crystallizing out trioxane therefrom, separating the crystals of trioxane from the mother liquor and thereafter washing said crystals with a small proportion of a substantially anhydrous monohydric aliphatic alcohol selected from the group consisting of methanol and ethanol at a temperature not in excess of approximately 0° C. to remove residual amounts of formaldehyde and water associated with the crystals.

3. A process for the recovery of trioxane from an aqueous distillate containing at least approximately 25% by weight of trioxane and containing formaldehyde, which comprises cooling said distillate to a temperature of approximately 5° C., separating the crystals of trioxane from the mother liquor and thereafter washing said crystals with substantially anhydrous methanol at a temperature not in excess of approximately 0° C. to remove residual amounts of formaldehyde and water associated with the crystals.

4. A process for the recovery of trioxane from an aqueous distillate containing at least approximately 25% by weight of trioxane and containing formaldehyde, which comprises cooling said distillate to a temperature of approximately 5° C., separating the crystals of trioxane from the mother liquor and thereafter washing said crystals with substantially anhydrous ethanol at a temperature not in excess of approximately 0° C. to remove residual amounts of formaldehyde and water associated with the crystals.

5. A process for the recovery of trioxane from an aqueous solution containing formaldehyde and a substantial proportion of trioxane, which comprises adding ammonia to said solution until the pH of said solution is at least approximately 8, thereafter cooling said solution until trioxane crystallizes out, continuing the cooling and thereafter separating the crystals of trioxane from the mother liquor and subsequently washing said crystals with a small portion of a substantially anhydrous monohydric aliphatic alcohol selected from the group consisting of methanol and ethanol at a temperature not in excess of approximately 0° C. to remove residual amounts of hexamethylenetetramine, ammonia and water associated with the crystals.

6. A process for the production of trioxane from formaldehyde, which comprises heating a concentrated aqueous solution of formaldehyde that is substantially free from methanol with a small proportion of a strong acid polymerization catalyst while distilling therefrom an aqueous distillate containing formaldehyde and trioxane, redistilling said aqueous distillate to produce an aqueous distillate containing formaldehyde and at least 25% by weight of trioxane, cooling said aqueous distillate to a lower temperature but above the freezing point of the distillate while crystallizing out trioxane therefrom, separating the crystals of trioxane from the mother liquor and thereafter washing said crystals with a small portion of a substantially anhydrous monohydric aliphatic alcohol selected from the group consisting of methanol and ethanol at a temperature not in excess of approximately 0° C. to remove residual amounts of formaldehyde and water associated with the crystals.

7. A process for the production of trioxane from formaldehyde, which comprises heating a concentrated aqueous solution of formaldehyde that is substantially free from methanol with a small proportion of sulfuric acid while distilling therefrom an aqueous distillate containing formaldehyde and trioxane, continuously adding to said aqueous formaldehyde solution to compensate for the distillate removed therefrom a 60% aqueous formaldehyde solution that is substantially free from methanol, redistilling said aqueous distillate to produce an aqueous distillate containing formaldehyde and at least 25% by weight of trioxane, cooling said distillate to a temperature of approximately 5° C., separating the crystals of trioxane from the mother liquor and washing said crystals with a small portion of a substantially anhydrous alcohol selected from the group consisting of methanol and ethanol at a temperature not in excess of approximately 0° C. to remove residual amounts of formaldehyde and water associated with the crystals.

HERMAN SOKOL.

REFERENCES CITED

The following references are of record in the file of this patent:

UNITED STATES PATENTS

| Number | Name | Date |
| --- | --- | --- |
| 2,304,080 | Frank | Dec. 8, 1942 |

OTHER REFERENCES

Walker—Formaldehyde, American Chemical Soc. Monograph Series, Reinhold Publishing Co. (1944), page 28.

Walker et al.—Chem. & Eng. News, Aug. 10, 1943, pp. 1250–1251.